(12) United States Patent
Womack et al.

(10) Patent No.: US 6,409,588 B1
(45) Date of Patent: Jun. 25, 2002

(54) DEVICE FOR SKINNING SQUIRRELS

(76) Inventors: James H. Womack, 654 Barnes Rd.; Paul K. Womack, 1379 Swartzfairbanks Rd., both of Monroe, LA (US) 71203

( * ) Notice: Subject to any disclaimer, the term of this patent is extended or adjusted under 35 U.S.C. 154(b) by 0 days.

(21) Appl. No.: 09/808,176

(22) Filed: Mar. 15, 2001

(51) Int. Cl.[7] .................................................. A22B 1/00
(52) U.S. Cl. ...................................... 452/187; 452/195
(58) Field of Search ................................. 452/195, 187, 452/189, 192; 294/81.2

(56) References Cited

U.S. PATENT DOCUMENTS

| | | | | |
|---|---|---|---|---|
| 3,137,030 A | * | 6/1964 | Varner | 452/187 |
| 3,570,049 A | * | 3/1971 | Muckelrath | 452/187 |
| 4,615,077 A | * | 10/1986 | Beebe | 452/187 |
| 4,625,363 A | * | 12/1986 | Watson | 452/187 |
| 4,656,693 A | * | 4/1987 | Brooks | 452/187 |
| 4,782,557 A | * | 11/1988 | Gladney et al. | 452/187 |

* cited by examiner

*Primary Examiner*—Peter M. Poon
*Assistant Examiner*—Joan Olszewski
(74) *Attorney, Agent, or Firm*—Breiner & Breiner, L.L.C.

(57) ABSTRACT

A device for skinning and field dressing small game is described. The device includes a base plate having four or more openings therein and a retaining element or holder. A first set of two openings are holes to receive free ends of the holder. The second set of two openings are to receive and removably retain the hind legs of a squirrel or the like and are positioned in a lower portion of the base plate. These openings each form a slot having an elongated shape with an essentially semi-circular top portion and a tapered-wall lower portion. The holder has in one plane a wider open section with a narrowed extension. At the end of the wider open section, the free ends are preferably structured as two downward extending hook-shaped portions which, in use, insert into the first set of two openings in the base plate. In use, the base plate is affixed to a support, such as a tree, and the holder is maintained in an outwardly extended position.

19 Claims, 1 Drawing Sheet

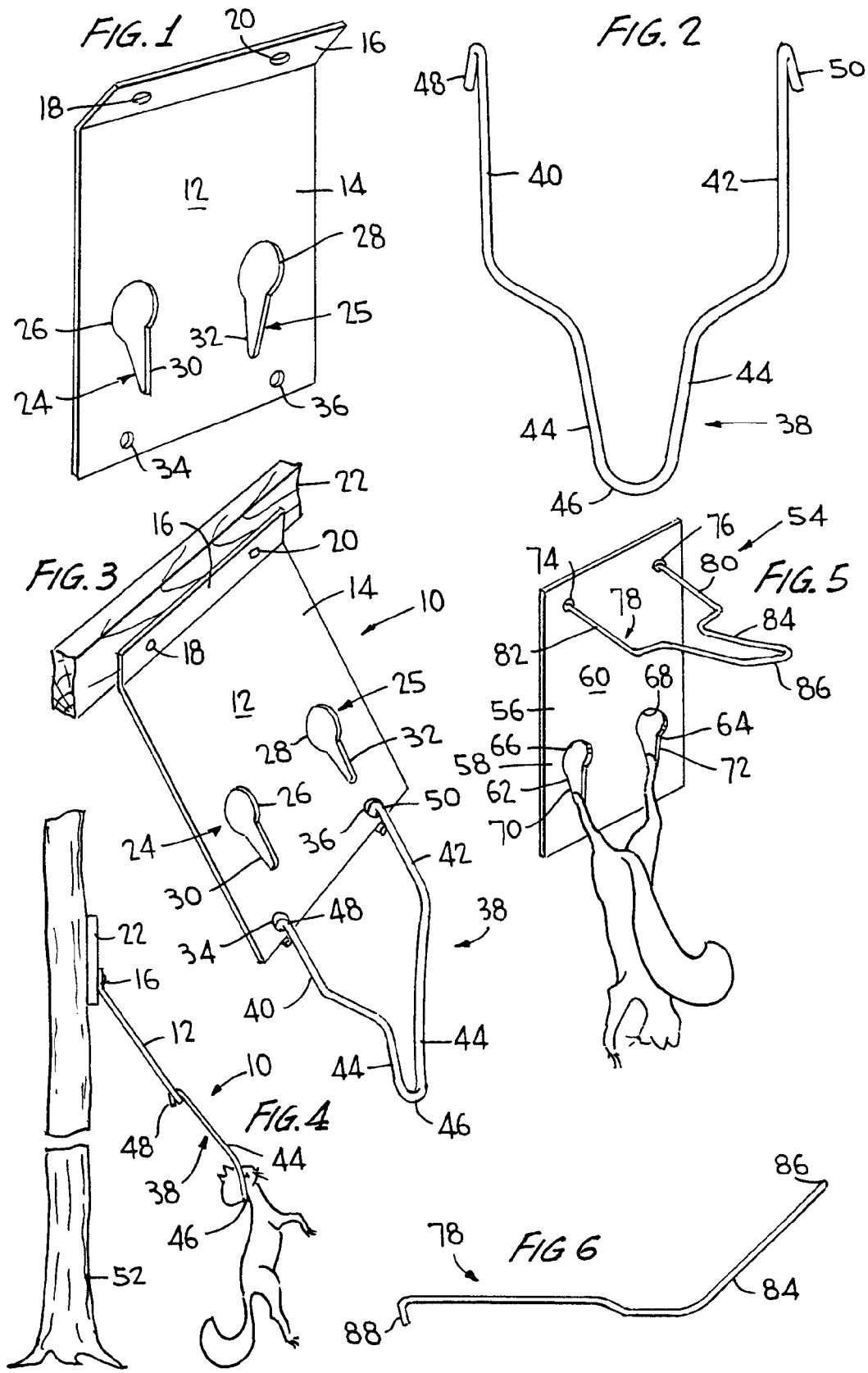

DEVICE FOR SKINNING SQUIRRELS

FIELD OF THE INVENTION

The present invention relates to a device for skinning and field dressing small game. More particularly, the present invention relates to a squirrel skinning device comprising a base plate and a holder or retaining element.

BACKGROUND OF THE INVENTION

There are a number of devices known in the prior art for holding small game while it is being skinned or dressed. For example, U.S. Pat. No. 4,656,693 to Brooks discloses a one piece game skinner including a base plate and a forward extending bar with multiple bends. The bar can be attached, such as by welding to the base plate. The bar is bent to include right angle bends and a U-shaped loop with a recess. Spikes are present at the right angle bends. The spikes serve to hold the hind legs of an animal being dressed by impaling the legs thereon. The head of an animal carcass is held in the loop. The base plate is attached to a support during dressing.

The shortcoming of the Brooks invention is its reliance on spikes and a rigid loop to secure the small game during skinning. The use of spikes to secure the hind legs of game during skinning results in tearing of the muscle tissue around the insertion point of the spikes and the eventual disengagement of the game from the device. Use of a rigid loop to secure the head of small game does not allow for flexibility when pulling down on the game while skinning. Consequently, when too much force is exerted in a downward direction there is a tendency for the animal to be decapitated and consequently dislodged from the device.

U.S. Pat. No. 4,625,363 to Watson discloses a one piece holder for dressing a squirrel. The holder includes a back portion, a central portion and a squirrel support portion. The support portion includes four tines which form a central slot and two outer slots. Each slot is V-shaped or tapered so that when the animal is placed in the central slot or in the outer slots according to the invention, a wedge effect is achieved to better hold the animal in place. The central slot is sized to receive a squirrel body in the area of the chest, i.e., at the squirrel's armpits. Thus, when downward force is applied, there is no possibility of decapitation of the animal. However, insertion of a squirrel into the central slot inhibits access to those portions of the squirrel's body in contact with the slot and surrounding tines. Furthermore, the one piece, rigid construction of the invention of the Watson patent precludes it from being collapsible.

U.S. Pat. No. 3,570,049 to Muckelrath discloses, a small game skinning board for animals including a panel with a neck receiving slot and feet receiving slots in the upper edge of the panel. The neck receiving slot is wider at the top and narrows downward to better receive and hold the neck of an animal. The feet receiving slots are backed by a metallic plate which includes serrations. The plate and serrations serve to hold the feet in the feet receiving slots, in particular, upon downward motion of the animal's body during skinning. The shortcoming of the Muckelrath invention is realized when downward force is exerted on the squirrel while it is being supported by the neck receiving slot. The configuration of the neck receiving slot in conjunction with its inability to flex increases the probability that the squirrel will be decapitated and disengaged from the device during skinning.

Another impaling apparatus is U.S. Pat. No. 3,137,030 to Varner which discloses a small game holder to allow dressing of an animal. The holder includes a plate with ears. Mounted for swinging movement in relation to the ears is a bail or shackle. Trunnions of the bail insert into the ears. The bail includes two prongs or hooks to hold the rear legs of an animal by impaling, as well as a notch to hold the head of the animal. In use, the holder is suspended. A squirrel, for example, is hung by the legs until dressing is completed on the underside. Then the squirrel is removed from the holder placing the neck in the notch with the backside facing outward for completion of the dressing.

Other, less relevant prior art patents are as follows U.S. Pat. Nos. 1,027,335 to Heyerdahl; U.S. Pat. No. 3,945,083 to Heightshoe; U.S. Pat. No. 4,094,041 to Steed; U.S. Pat. No. 4,543,688 to Barchus; U.S. Pat. No. 4,581,790 to Horvath; and U.S. Pat. No. 6,015,339 to Lochbrunner.

OBJECTS AND SUMMARY OF THE INVENTION

The present invention overcomes the shortcomings of the prior art devices described above. The present invention overcomes these problems by fulfilling the need for a lightweight, compact, stable yet flexible platform used for skinning and field dressing a squirrel.

It is therefore a primary object of the present invention to provide a squirrel skinner having a base plate including a pair of slots, each slot with a semi-circular top portion and a bottom tapered wall portion, and a pair of openings through which a flexible holder is insertable for securing a squirrel's head.

A further primary object of the present invention is to provide a squirrel skinning device having slots through which a squirrel's hind legs are placed while skinning. These slots provide a secure platform for skinning a squirrel and circumvent the problem of tearing muscle tissue associated with the use of spikes as disclosed by the Brooks and Varner patents.

A further primary object of the present invention is to provide a squirrel skinning device having a holder constructed of a structural material that allows the holder to flex when pressure is exerted on the holder. The flexing action decreases the amount of force exerted on the neck of the squirrel during skinning thus decreasing the chance of decapitation of the squirrel.

Another object of the present invention is to provide a squirrel skinning device having a holder that is collapsible, thus allowing for easy storage and transport of the device.

A further object of the present invention is to provide a squirrel skinning device that does not obstruct one's access to the body of the squirrel during skinning.

The aforementioned and other objects are achieved according to the invention by providing a squirrel skinning device comprising a rigid base plate which is preferably substantially rectangular and constructed of a durable, non-corrosive, lightweight material, having a bottom portion and a forwardly bent top portion. The forwardly bent top portion has two openings or holes through which fasteners, such as nails, screws or the like, are inserted for securing the base plate to a support. Any number of materials may serve as a support, such as a piece of wood, tree or the like. The wood in turn can be attached to a building wall or support on a vehicle. The forwardly bent top portion of the base provides that the base extends outward of the support structure to which the base is attached. This provides for better access during use of the device as further described below. The bottom portion includes a pair of slots, each slot possessing a semi-circular top portion with a tapered lower portion, and a pair of openings through which a holder is inserted. The holder is pivotably attached to the base plate thereby providing a flexing action when pressure is exerted on the holder.

The holder comprises a substantially U-shaped durable, non-corrosive, lightweight wire having two arms situated substantially parallel to one another, the arms being connected on one end by a downwardly bent narrowed extension. Formed centrally within the narrowed extension is a rounded portion or loop. Opposite the loop, positioned at the outward end of each arm of the holder are hook-shaped portions adapted to be inserted into the openings in the bottom portion of the base plate. When in use, the holder is attached to the base plate. A closed area wider portion is thus present adjacent the base plate which adjoins the area formed by the loop portion. The support in use is securely fastened to any number of structures, such as a tree, a barn or pick-up truck. The holder can flex when pressure is exerted on the holder when skinning and field dressing a squirrel.

To skin a squirrel using the device, the hind feet of the squirrel are first inserted through the slots at the top semi-circular portion so that the squirrel is facing inward toward the base plate. The feet of the squirrel are then slid downward allowing the tapered walls of each slot to more securely retain the feet therein. The skin is then removed from the back of the squirrel in a known manner.

Thereafter, the feet are removed from the slots, and the squirrel is positioned parallel to the base plate and above the holder with the squirrel facing outward from the base plate. The head of the squirrel is inserted into the wider portion of the holder, and slid toward the loop of the holder. Accordingly, the head of the squirrel is then positioned within and above the loop allowing for the animal to be securely held within the holder. The skin is then removed from the belly and hind portions of the squirrel, and the squirrel is gutted.

The rigid base plate and holder can each be made of a suitable metal or plastic. If made of metal, the metal is preferably coated with an appropriate substance so as to prevent corrosion of the metal which could otherwise occur upon washing the device following use.

BRIEF DESCRIPTION OF THE DRAWINGS

For a better understanding of the invention as well as other objects and features thereof, reference is made to the following detailed description of the presently preferred embodiment in connection with the accompanying drawings, wherein:

FIG. 1 is a front, perspective view of the base plate of the present invention;

FIG. 2 is a top plan view of the holder of the present invention;

FIG. 3 is a front perspective view of a preferred embodiment of the present invention;

FIG. 4 is side view of the preferred embodiment of FIG. 3 in non-use;

FIG. 5 is front perspective view of an alternative embodiment of the present invention; and FIG. 6 is a side view of an alternative embodiment of the holder of the present invention.

DETAILED DESCRIPTION AND PRESENTLY PREFERRED EMBODIMENTS

Referring to FIGS. 1, 2, 3 and 4, in accordance with the preferred embodiment of the device of the present invention, a squirrel skinning device is shown designated generally by reference numeral 10.

Squirrel skinning device 10 includes a rigid base plate 12 which is preferably substantially rectangular and constructed of a durable, non-corrosive, lightweight material having a bottom portion 14 and a forwardly bent top portion 16. Forwardly bent top portion 16 has at least one opening, preferably two openings or holes 18, 20, through which fastener(s) such as nails, screws or the like, are inserted for securing base plate 12 to a support 22, such as a two by four piece of wood or the like. Bottom portion 14 includes a pair of slots 24, 25. Each slot possesses a semi-circular top portion 26, 28 and a tapered lower portion 30, 32. A pair of openings 34, 36 are also present in the bottom of plate 12 through which a holder or retaining element 38 is inserted. Semi-circular top portions 26, 28 are sized to allow insertion of the hind legs of a squirrel through the base plate. Tapered lower portions 30, 32 are sized to securely grip the squirrel's hind legs via a wedging action as the squirrel's legs are pushed downwardly into the bottom portion of tapered portions 30, 32.

Holder 38 includes a substantially U-shaped durable, non-corrosive, lightweight wire, preferably of metal, having two arms 40, 42 situated substantially parallel to one another. Arms 40, 42 are connected on one end by a downwardly bent narrowed extension 44. Formed centrally as part of narrowed extension 44 is a rounded portion or loop 46 which is structured to ultimately be positioned around a squirrel's head opposite loop 46, positioned at the outward ends of arms 40, 42 of holder 38 are hook-shaped portions 48, 50 which are structured to be inserted into openings 34, 36 in bottom portion 14 of base plate 12. When in use, holder 38 is attached to base plate 12, and support 22 is securely fastened to any number of structures 52, such as a tree, a barn wall, pick-up truck or the like.

The preferred embodiment is used as described above.

An alternative embodiment of the invention is shown in FIGS. 5 and 6. The squirrel skinning device is designated generally by reference numeral 54. The device 54 preferably includes a substantially rectangular, flat base plate 56 constructed of a durable, non-corrosive, lightweight material having a bottom portion 58 and a top portion 60. Bottom portion 58 includes a pair of slots 62, 64. Each slot possesses a semi-circular top portion 66, 68 and a tapered lower portion 70, 72. Top portion 60 includes a pair of openings 74, 76 through which a holder 78 is inserted.

Holder 78 preferably is substantially U-shaped durable, non-corrosive, lightweight metal wire having two arms 80, 82 positioned substantially parallel to one another. Arms 80, 82 are connected on one end by an upwardly bent narrowed extension 84. Formed centrally within narrowed extension 84 is a rounded portion or loop 86. Opposite loop 86, positioned at each outward end of arms 80, 82 of holder 78 is a hook-shaped portion 88 adapted to be inserted into openings 74, 76 in top portion 60 of base plate 56.

When in use, holder 78 is attached to base plate 54, and base plate 54, in turn, is fastened to a support, such as a piece of wood or the like, such that bottom portion 58 overhangs the support thereby providing an area to accommodate a squirrel's legs when inserted through slots 62, 64. The support is then attached to any number of structures, such as a tree, a barn wall, pick-up truck or the like.

To skin a squirrel using the alternative embodiment of FIGS. 5 and 6, the hind feet of the squirrel are first inserted through slots 62, 64 so that the squirrel is facing inward toward base plate 56. The hind feet of the squirrel are then slid downwardly allowing tapered slots 70, 72 to more securely retain the feet. The skin is then removed from the back of the squirrel in a conventional manner.

Thereafter, the feet are removed from slots 62, 64, and the squirrel is positioned parallel to base plate 56 and below holder 78 with the squirrel facing away from base plate 56. The head is then inserted through holder 78, and the neck of the squirrel slid toward loop 86. Accordingly, the neck of the squirrel is positioned within loop 86 allowing for the animal to be securely held within holder 78. The skin is then removed from the belly and hind portions of the squirrel, and the squirrel is gutted.

As will be apparent to one skilled in the art, various modifications can be made within the scope of the aforesaid description. Such modifications being within the ability of one skilled in the art form a part of the present invention and are embraced by the appended claims.

It is claimed:

1. A squirrel skinning device comprising:

a rigid base plate having a bottom portion and a forwardly bent top portion; and a holder with two free ends and a rounded narrowed central portion;

wherein said base plate includes a pair of slots located in the bottom portion with each slot having a wider top portion and tapered lower portion; and a pair of openings located in the bottom portion of the base plate constructed and arranged to receive and removably retain therein the two free ends of said holder.

2. The device in accordance with claim 1 wherein said forwardly bent top portion includes at least one hole through which at least one fastener is insertable for securing the base plate to a support.

3. The device in accordance with claim 1 wherein the wider top portion of each slot of said pair of slots is of a semi-circular shape.

4. The device in accordance with claim 1 wherein said holder includes substantially parallel arms, said arms being constructed and arranged at a first end to form a downwardly bent narrowed extension portion and each of said arms having at a second end a hooked-shaped portion, said downwardly bent narrowed extension portion having a centrally located rounded portion.

5. The device in accordance with claim 1 wherein said holder is constructed of a non-corrosive metal wire.

6. The device of claim 1 wherein said base plate is constructed of a non-corrosive metal.

7. A squirrel skinning device comprising:

a substantially flat base plate having a bottom portion and a top portion;

a holder with two free ends and a rounded narrowed central portion;

a pair of slots located in the bottom portion of the base plate with each slot having a wider top portion and a tapered lower portion; and a pair of openings located in the top portion of the base plate constructed and arranged to receive and removably retain therein the two free ends respectively of said holder.

8. The device in accordance with claim 7 wherein said top portion includes at least one hole through which at least one fastener is insertable for securing the base plate to a support.

9. The device in accordance with claim 7 wherein said top portion of each of said pair of slots has a semi-circular shape.

10. The device in accordance with claim 7 wherein said holder includes substantially parallel arms, said arms being constructed and arranged on a first end to provide an upwardly bent narrowed extension portion and each of said two free ends has a hooked-shaped portion, said upwardly bent narrowed extension portion forming a centrally located rounded portion.

11. The device of claim 7 wherein said holder is constructed of a non-corrosive metal wire.

12. The device of claim 7 wherein said base plate is constructed of a non-corrosive metal.

13. A device for skinning a small animal comprising:

a rigid base plate having two openings in a lower portion thereof, each of said two openings having a substantially round upper portion which tapers downward to a narrow portion; and a retaining element removably attachable to said rigid base plate and being constructed and arranged to retain a head of an animal, said retaining element when attached to said base plate having a wide open portion and a narrow open portion;

wherein said base plate has in an upper portion thereof at least one opening for receiving an attachment element for attaching said base plate to a support.

14. The device of claim 13 wherein the upper portion containing said at least one opening is bent forward such that when said upper portion which is bent forward is laid flat against said support, the lower portion of said rigid base plate extends outward of said support.

15. The device of claim 13 wherein said retaining element is attached to the lower portion of said rigid base plate below said two openings.

16. The device of claim 14 wherein said retaining element is attached to the lower portion of said rigid base plate below said two openings.

17. The device according to claim 16 wherein the narrow open portion of said retaining element is angled downward.

18. The device of claim 13 wherein said retaining element is attached to said upper portion of said rigid base plate.

19. The device of claim 18 wherein the narrow open portion of said retaining element is angled upward.

* * * * *